United States Patent
Kuepper et al.

(10) Patent No.: US 11,583,788 B1
(45) Date of Patent: Feb. 21, 2023

(54) LIGHTWEIGHT FIBROUS MEDIA (LFM) FILTER

(71) Applicants: Theodore A. Kuepper, Oxnard, CA (US); Robert C. Lovo, Somis, CA (US)

(72) Inventors: Theodore A. Kuepper, Oxnard, CA (US); Robert C. Lovo, Somis, CA (US)

(*) Notice: Subject to any disclaimer, the term of this patent is extended or adjusted under 35 U.S.C. 154(b) by 0 days.

(21) Appl. No.: 17/746,246

(22) Filed: May 17, 2022

Related U.S. Application Data

(63) Continuation-in-part of application No. 17/577,558, filed on Jan. 18, 2022.

(51) Int. Cl.
| | | |
|---|---|---|
| *B01D 24/14* | (2006.01) | |
| *C02F 1/00* | (2006.01) | |
| *C02F 1/52* | (2006.01) | |
| *B01D 24/48* | (2006.01) | |
| *B01D 24/46* | (2006.01) | |
| *B01D 39/04* | (2006.01) | |

(52) U.S. Cl.
CPC ......... *B01D 24/14* (2013.01); *B01D 24/4663* (2013.01); *B01D 24/4876* (2013.01); *B01D 39/04* (2013.01); *C02F 1/004* (2013.01); *C02F 1/52* (2013.01); *C02F 2303/16* (2013.01)

(58) Field of Classification Search
None
See application file for complete search history.

(56) References Cited

U.S. PATENT DOCUMENTS

| | | | | | |
|---|---|---|---|---|---|
| 191,131 | A | * | 5/1877 | Gainey | B01D 29/15 210/411 |
| 247,117 | A | * | 9/1881 | Scharff | B01D 24/12 210/287 |
| 515,769 | A | * | 3/1894 | Harris | B01D 29/46 210/411 |
| 620,621 | A | * | 3/1899 | Veazie | A47J 43/24 210/291 |
| 857,450 | A | * | 6/1907 | Land | B01D 24/4884 210/287 |
| 3,122,594 | A | * | 2/1964 | Kielback | B01J 19/30 422/256 |
| 3,219,194 | A | * | 11/1965 | Schwartzwalder | B01D 35/06 210/500.1 |
| 3,471,025 | A | * | 10/1969 | Dobson | B01D 24/12 210/282 |
| 3,747,769 | A | * | 7/1973 | Brumfield | B01D 29/05 55/DIG. 13 |

(Continued)

*Primary Examiner* — Robert J Popovics
(74) *Attorney, Agent, or Firm* — Sandy Lipkin

(57) ABSTRACT

A filtration system using lightweight fibrous media (LFM) that are pre-compressed either 1) manually; or 2) in-situ using hydraulic flow; and where the LFM are forced to separate and relax for cleaning either: 1) manually, 2) in-situ in their filter housing, or 3) in an auto-clean system using separate devices in order to enact a particularly aggressive cleaning process. A plurality of lightweight fibrous media balls are pre-compressed and used to form a single mass that can filter water as the media are compressed by pre-compression before installation, or by water flow pushing on a pre-compression plate during filtration thereby forming a single mass providing multitudes of tortuous paths through which water can flow and the media can capture small particulate matter.

6 Claims, 12 Drawing Sheets

(56) References Cited

U.S. PATENT DOCUMENTS

| | | | | | |
|---|---|---|---|---|---|
| 3,954,621 | A * | 5/1976 | Etani | | B01D 35/12 210/167.14 |
| 4,022,694 | A * | 5/1977 | Fruman | | B01D 17/0202 210/350 |
| 4,039,452 | A * | 8/1977 | Fernandez | | B01D 29/05 210/136 |
| 4,157,959 | A * | 6/1979 | Wen | | B01D 24/4668 95/275 |
| 4,186,101 | A * | 1/1980 | Reinhardt | | B01D 39/14 55/528 |
| 4,246,119 | A * | 1/1981 | Alldredge | | B01D 24/4668 210/279 |
| 4,252,653 | A * | 2/1981 | Beck | | B01D 15/08 210/507 |
| 4,253,947 | A * | 3/1981 | Fan | | C02F 3/085 210/618 |
| 4,290,785 | A * | 9/1981 | Alldredge | | G21F 9/02 55/293 |
| 4,317,733 | A * | 3/1982 | Xhonneux | | C02F 9/005 210/275 |
| 4,322,296 | A * | 3/1982 | Fan | | C12M 25/18 210/903 |
| 4,350,590 | A * | 9/1982 | Robinson | | B03C 5/024 210/243 |
| 4,420,404 | A * | 12/1983 | Coate | | B01D 29/824 210/350 |
| 4,427,555 | A * | 1/1984 | Brown | | B01D 24/4631 210/136 |
| 4,438,000 | A * | 3/1984 | Fan | | B01D 24/4684 210/807 |
| 4,487,727 | A * | 12/1984 | Ballato, Jr. | | B01J 19/30 261/DIG. 72 |
| 4,495,074 | A * | 1/1985 | Hagiwara | | B01D 35/06 210/275 |
| 4,497,707 | A * | 2/1985 | Anderson | | B01D 35/157 210/508 |
| 4,524,139 | A * | 6/1985 | Fuchs | | C02F 3/10 210/792 |
| 4,601,825 | A * | 7/1986 | Eriksson | | B01D 17/0202 210/287 |
| 4,608,181 | A * | 8/1986 | Hsiung | | B01D 24/4621 210/795 |
| 4,624,789 | A * | 11/1986 | Fan | | C02F 1/281 210/661 |
| 4,652,379 | A * | 3/1987 | Nyberg | | B01D 39/14 210/717 |
| 4,719,020 | A * | 1/1988 | Elmaleh | | C02F 1/52 210/795 |
| 4,776,962 | A * | 10/1988 | Wakeman | | B01D 24/4668 210/243 |
| 4,963,257 | A * | 10/1990 | Schulz | | C02F 1/5281 210/291 |
| 5,194,231 | A * | 3/1993 | Gough | | B01J 19/32 210/150 |
| 5,248,415 | A * | 9/1993 | Masuda | | B01D 39/1623 210/275 |
| 5,429,740 | A * | 7/1995 | Van Der Herberg | | C02F 3/087 210/151 |
| 5,445,740 | A * | 8/1995 | Malone | | C02F 3/06 210/150 |
| 5,486,289 | A * | 1/1996 | McCullough | | B01D 15/206 210/350 |
| 5,549,823 | A * | 8/1996 | Hirs | | B01D 17/0208 210/167.01 |
| 5,587,239 | A * | 12/1996 | Ueba | | C02F 3/085 428/377 |
| 5,690,823 | A * | 11/1997 | Reipur | | B01D 35/10 210/500.1 |
| 5,702,604 | A * | 12/1997 | Yamasaki | | C02F 3/06 210/603 |
| 5,750,041 | A * | 5/1998 | Hirane | | B01D 24/4684 210/150 |
| 5,770,080 | A * | 6/1998 | Malone | | C02F 3/10 210/279 |
| 5,984,108 | A * | 11/1999 | Choi | | B01D 29/114 210/791 |
| 5,985,148 | A * | 11/1999 | Liu | | C02F 3/103 210/150 |
| 5,989,424 | A * | 11/1999 | Serenko | | C02F 1/003 210/282 |
| 5,989,435 | A * | 11/1999 | Herman | | B03C 1/025 210/695 |
| 6,015,497 | A * | 1/2000 | Steen, Jr. | | C02F 3/087 210/150 |
| 6,110,389 | A * | 8/2000 | Horowitz | | B01D 24/165 210/150 |
| 6,143,187 | A * | 11/2000 | Robertson | | C02F 3/085 210/354 |
| 6,238,556 | B1 * | 5/2001 | Hawk | | B01D 24/4636 210/278 |
| 6,517,724 | B1 * | 2/2003 | Malone | | C02F 3/06 210/279 |
| 6,605,216 | B1 * | 8/2003 | Lederman | | B01D 24/165 210/269 |
| 7,093,720 | B2 * | 8/2006 | Hoffmeier | | B01D 24/08 210/350 |
| 7,147,781 | B2 * | 12/2006 | Gordic | | C02F 3/06 210/194 |
| 7,204,930 | B2 * | 4/2007 | Nightingale | | C02F 1/74 210/111 |
| 7,223,347 | B2 * | 5/2007 | Boner | | B01D 24/12 210/795 |
| 7,374,676 | B2 * | 5/2008 | Dew, Jr. | | B01D 24/002 210/291 |
| 7,416,667 | B2 * | 8/2008 | Benachenou | | B01D 17/0208 210/DIG. 5 |
| 7,435,351 | B2 * | 10/2008 | Boner | | C02F 1/004 210/795 |
| 7,442,295 | B2 * | 10/2008 | Cheng | | C02F 3/04 210/260 |
| 7,513,372 | B2 * | 4/2009 | Carew | | B01D 29/48 210/497.1 |
| 7,572,383 | B2 * | 8/2009 | Dew, Jr. | | B01D 24/4663 210/741 |
| 7,635,435 | B2 * | 12/2009 | Benachenhou | | B01J 20/262 210/791 |
| 8,142,651 | B1 * | 3/2012 | Chernoff | | C02F 1/5281 210/519 |
| 8,353,344 | B2 * | 1/2013 | Carlson | | C09K 8/035 166/308.5 |
| 8,721,895 | B2 * | 5/2014 | Benachenou | | B01D 17/0208 210/671 |
| 9,149,746 | B2 * | 10/2015 | Choi | | B01D 41/02 |
| 9,169,580 | B2 * | 10/2015 | Griggs | | C02F 1/001 |
| 9,352,254 | B2 * | 5/2016 | Lee | | B01D 24/12 |
| 9,440,864 | B2 * | 9/2016 | Woo | | C02F 1/001 |
| 9,718,004 | B2 * | 8/2017 | Fujita | | B01D 24/165 |
| 9,827,512 | B2 * | 11/2017 | Malone | | B01D 24/40 |
| 10,071,926 | B2 * | 9/2018 | Boodaghians | | B01D 27/02 |
| 10,112,855 | B2 * | 10/2018 | Malone | | C02F 3/06 |
| 10,131,559 | B2 * | 11/2018 | Fonseca | | C02F 3/00 |
| 10,434,446 | B2 * | 10/2019 | Desmottes | | B01D 24/4631 |
| 10,549,217 | B2 * | 2/2020 | Park | | B01D 29/58 |
| 10,596,495 | B2 * | 3/2020 | Lee | | C02F 1/008 |
| 10,722,829 | B2 * | 7/2020 | Morris | | D04H 1/5418 |
| 10,744,429 | B2 * | 8/2020 | Oz | | B01D 29/74 |
| 10,864,465 | B2 * | 12/2020 | Boyd | | C02F 1/004 |
| 10,905,985 | B2 * | 2/2021 | Oz | | B01D 29/66 |
| 10,913,667 | B2 * | 2/2021 | St. Germain | | C02F 1/004 |
| 11,000,787 | B2 * | 5/2021 | Park | | B01D 24/4636 |
| 11,192,050 | B2 * | 12/2021 | Lee | | B01D 29/58 |
| 11,247,918 | B2 * | 2/2022 | St. Germain | | C02F 1/285 |
| 2003/0111431 | A1 * | 6/2003 | Dew, Jr. | | B01D 24/002 210/807 |
| 2004/0112823 | A1 * | 6/2004 | Benachenou | | B01D 17/045 210/285 |
| 2004/0140256 | A1 * | 7/2004 | Dew, Jr. | | B01D 24/4663 210/274 |

(56) References Cited

U.S. PATENT DOCUMENTS

| | | | |
|---|---|---|---|
| 2004/0226897 A1* | 11/2004 | Boner | B01D 24/12 210/793 |
| 2005/0011825 A1* | 1/2005 | Hoffmeier | B01D 24/4631 210/426 |
| 2005/0161411 A1* | 7/2005 | Boner | B01D 24/4631 210/793 |
| 2005/0161412 A1* | 7/2005 | Boner | C02F 1/004 210/275 |
| 2006/0157397 A1* | 7/2006 | Yokota | B01J 20/28035 210/266 |
| 2006/0231510 A1* | 10/2006 | Benachenhou | B01D 17/0208 210/DIG. 5 |
| 2007/0062872 A1* | 3/2007 | Parker | B01J 8/22 528/480 |
| 2008/0011659 A1* | 1/2008 | Cheng | C02F 3/06 210/151 |
| 2008/0053891 A1* | 3/2008 | Koops | D01D 5/06 428/394 |
| 2008/0060985 A1* | 3/2008 | Carew | B01D 29/925 210/497.1 |
| 2008/0245743 A1* | 10/2008 | Dew | B01D 24/4663 210/745 |
| 2008/0257804 A1* | 10/2008 | Dew | B01D 24/4663 210/170.08 |
| 2008/0257805 A1* | 10/2008 | Dew | B01D 24/04 210/259 |
| 2011/0147321 A1* | 6/2011 | Oz | B01D 24/08 210/287 |
| 2012/0145651 A1* | 6/2012 | Chen | B01D 65/108 210/777 |
| 2012/0211430 A1* | 8/2012 | Choi | B01D 39/02 210/275 |
| 2013/0001161 A1* | 1/2013 | Boner | C02F 3/103 210/615 |
| 2013/0220913 A1* | 8/2013 | Cohen | B01D 24/4631 210/275 |
| 2014/0014562 A1* | 1/2014 | Woo | B03D 1/14 210/151 |
| 2014/0291224 A1* | 10/2014 | Fujita | B01D 24/10 210/287 |
| 2015/0182884 A1* | 7/2015 | Lee | B01D 24/12 210/241 |
| 2016/0101993 A1* | 4/2016 | Tilz | B01D 24/007 210/776 |
| 2016/0220930 A1* | 8/2016 | Oz | B01D 29/74 |
| 2016/0271540 A1* | 9/2016 | Nielsen | B01D 24/10 |
| 2017/0120170 A1* | 5/2017 | Desmottes | B01D 24/12 |
| 2017/0368482 A1* | 12/2017 | Lee | C02F 1/008 |
| 2018/0028945 A1* | 2/2018 | Park | B01D 24/4636 |
| 2019/0046901 A1* | 2/2019 | Boyd | C02F 1/004 |
| 2019/0177181 A1* | 6/2019 | St. Germain | C02F 1/285 |
| 2019/0194035 A1* | 6/2019 | Mackay Pett | B01D 29/68 |
| 2020/0122060 A1* | 4/2020 | Park | B01D 24/007 |
| 2020/0179838 A1* | 6/2020 | Lee | B01D 24/40 |
| 2021/0093986 A1* | 4/2021 | Boyd | B01D 24/4621 |
| 2021/0155506 A1* | 5/2021 | St. Germain | C02F 1/004 |
| 2021/0402331 A1* | 12/2021 | Farley | B01D 24/10 |

* cited by examiner

LIGHTWEIGHT FIBROUS MEDIA (LFM) FILTER

REFERENCE TO PRIOR APPLICATION

This application is a continuation-in-part application of application Ser. No. 17/577,558 filed Jan. 18, 2022, entitled LIGHTWEIGHT FIBROUS MEDIA (LFM) FILTER by Theodore A. Kuepper and Robert C. Lovo.

BACKGROUND OF THE INVENTION

Field of the Invention

The field of this invention relates generally to the field of filtration using filter media and more particularly toward a filter that uses pre-compressed lightweight fibrous media for increased removal of water-borne particulate matter that is easily portable, washable and reusable.

Description of the Prior Art

The use of filter balls that are lightweight and fibrous are known in the prior art with two distinct characteristics. One characteristic of the prior art methods includes the use of individual filter balls without adequate pre-compression of the balls. This approach has proven during filtration evaluation tests to not work well because inadequate pre-compression of the filter balls does not create a dense-enough filtration media to remove small, water-borne particulates, which create turbidity in water, and must be removed in order to measure a higher quality of water after filtration.

Another characteristic of the prior art methods includes the use of a mechanical apparatus to pre-compress filter balls. This method may work well for large, high-flow filtration systems, but is not appropriate for medium-flow and low-flow filtration systems because they require mechanical components with sophisticated sealing surfaces and are complicated, cumbersome and expensive to fabricate, install and maintain. Inadequate pre-compression and the complication, size and expense of mechanical devices to pre-compress filter balls are precisely why filter balls are not typically used today in a wide variety of filtration applications, especially mobile applications where lightweight and effective water filters are so needed for US military, emergency and disaster relief operations.

It is the object of the instant invention to provide an improved apparatus and method that overcomes the shortcomings of the prior art.

SUMMARY OF THE INVENTION

The basic embodiment of the present invention teaches a filtration system comprising: a plurality of lightweight fibrous media (LFM) balls; pre-compression of said lightweight fibrous media balls into a pre-determined single pre-compressed filtration mass for a known, uniform and consistent level of filtration therethrough of raw water; a configuration for the placement of said pre-compressed single filtration mass that is placed into a pressure-holding housing wherein when said raw water is introduced into said pressure-holding housing through a water inlet and said raw water passes through said single pre-compressed filtration mass through a multitude of tortuous paths for the trapping of small particulates, oil or other contaminants in said raw water therein and said filtered water exits said pressure-holding housing through an outlet and wherein said single pre-compressed filtration mass can be relaxed into a non-compressed state for cleaning and re-use.

The above embodiment can be further modified by defining that pre-compression is accomplished through the introduction of a hydraulic pre-compression plate into said pressure-holding housing to apply a consistent force and pressure to said single pre-compressed filtration mass when water flows through the housing.

The above embodiment can be further modified by defining that said hydraulic pre-compression plate has one or more apertures therethrough thereby allowing water to travel through said hydraulic pre-compression plate in addition to around edges of said hydraulic pre-compression plate.

The above embodiment can be further modified by defining that pre-compression is accomplished through the manual introduction of said lightweight fibrous media (LFM) into said pressure-holding housing and compacted therein.

The above embodiment can be further modified by defining that pre-compression is accomplished through the force of water acting against said hydraulic pre-compression plate inside of said pressure-holding housing through the movement of water therethrough.

The above embodiment can be further modified by defining that said single pre-compressed filtration mass is forced to relax and separate to facilitate cleaning when a specific differential pressure is reached inside of said pressure-holding housing and across said single pre-compressed filtration mass.

The above embodiment can be further modified by defining that said single pre-compressed filtration mass is forced to relax and separate to facilitate cleaning at pre-determined time intervals.

The above embodiment can be further modified by defining that said single pre-compressed filtration mass is removed from said assembly for relaxation and manual cleaning.

The above embodiment can be further modified by defining that said single pre-compressed filtration mass is forced to separate and relax inside said pressure-holding housing to facilitate cleaning through the introduction of turbulent water and airflow into said pressure-holding housing through said inlet thereby forcing said hydraulic pre-compression plate upward from said inlet thereby separating and relaxing said single pre-compressed filtration mass into individual lightweight fibrous media (LFM) balls which are agitated and cleaned through the force of said turbulent water and airflow.0. The filtration system as defined in claim 1 wherein said lightweight fibrous media (LFM) balls are placed and pre-compressed into a filter cartridge or basket assembly and then said filter cartridge or basket assembly is placed inside of said pressure-holding housing.

The above embodiment can be further modified by defining that a perforated tube is placed into a cartridge filter or basket assembly and into said lightweight fibrous media (LFM) single pre-compressed filtration mass for the movement of water therethrough and to allow water to exit said pressure-holding housing.

The above embodiment can be further modified by defining that lightweight fibrous media (LFM) material surrounds an inner cartridge filter layer of known micron separation said filter layer of known micron separation containing a filtered water tube in its center thereof for the movement of water therethrough and to allow water to exit said pressure-holding housing.

The above embodiment can be further modified by defining that a conventional cartridge filter and identified here as an inner filter, is placed in the center of the LFM filter assembly housing and takes the place of the perforated tube. Like the perforated tube, the inner filter is placed into said LFM filter mass and provides a final, specific micron filtration layer, either nominal or absolute, as well as the movement of water therethrough. In this case, the LFM material is used in a single filter configuration that combines the performance of a media filter with the known micron removal of a cartridge filter. In this particular configuration, the LFM material will act as a pre-filter to reduce particular loading on the inner filter with a known micron removal, especially useful for use with absolute-rated filters that are known to be prone to particulate "blinding" and premature fouling.

The above embodiment can be further modified by defining that said filter housing is connected via conduit on one end to a standby container containing clean lightweight fibrous media balls and via a second conduit on a second end to a washer device wherein said conduits allow for the movement therethrough of lightweight fibrous media such that lightweight fibrous media in said standby container moves through said conduit into said filter housing after the lightweight fibrous media inside of said filter housing has been removed through said second conduit for cleaning inside of said washer device so that filtration may continue while previously used and dirty lightweight fibrous media are being cleaned after which said cleaned lightweight fibrous media is returned to said standby container.

The above embodiment can be further modified by defining that one or more agitators are housed inside of said washer device to clean said lightweight fibrous media.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 8A does not show the complete auto-clean system configuration and most notably does not show the separate LFM washer device.

FIG. 8B shows the Lightweight Filter Media being transported into a separate washer device in an auto-clean system configuration after the LFM became dirty during use inside the filter housing. Note: FIG. 8B does not show the complete auto-clean system configuration and most notably does not show the LFM stand-by container.

FIG. 8C shows clean Lightweight Filter Media being transferred to the filter housing after dirty LFM have been removed to a separate washer device. Note: FIG. 8C does not show the complete auto-clean system configuration and most notably does not show the separate LFM washer device.

FIG. 8D shows the newly cleaned Lightweight Filter Media being transferred to a stand-by container after cleaning in a separate washer device. Note: FIG. 8D does not show the complete auto-clean system configuration and most notably does not show the LFM filter housing.

DETAILED DESCRIPTION OF A PREFERRED EMBODIMENT

Figure 1:
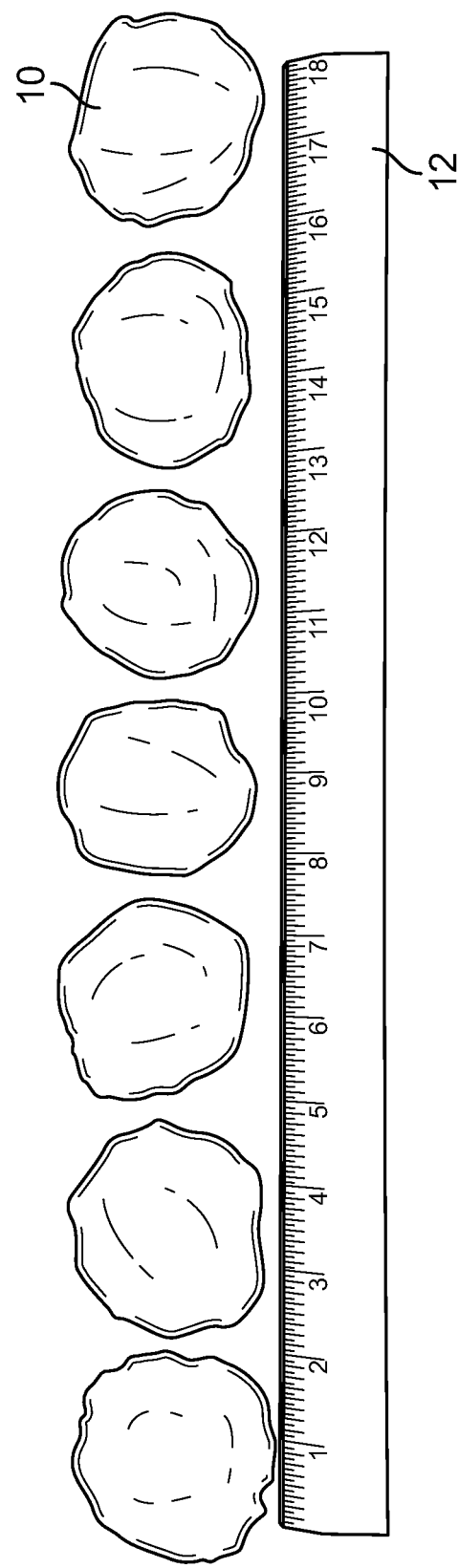
FIG. 1 is a plan view of a plurality of the lightweight fibrous media (LFM) filter balls as used in the instant invention set against a ruler to provide context for a typical size of said media. It is understood that other sizes and shapes used to make lightweight fibrous media filters that are not shaped like round balls are also envisioned to work as this invention describes. For example, a square or oblong shape either larger or smaller than the round-shaped balls shown in FIG. 1 could be used to make lightweight fibrous media filters. In addition, LFM material could be fabricated into a flexible, flat sheet configuration and wrapped around a perforated center tube in the same location where the LFM filter balls are now located as shown in FIG. 2. A single, flat sheet structure of LFM material may be useful to accommodate different filter configurations and ease of manufacturing and assembly. But for ease of clarification for this invention, a ball shape is used to describe the invention.

Turning to the drawings, the preferred embodiment is illustrated and described by reference characters that denote similar elements throughout the several views of the instant invention.

The preferred embodiment of the instant invention provides for a filtration system that utilizes pre-compressed Lightweight Filter Media (hereinafter "LFM") balls 10. The LFM filter uses a synthetic material shaped into fibrous balls 10. As shown in FIG. 1, a line of 7 LFMs 10 are shown next to a ruler 12 for scale. The individual LFM filter balls 10 are pre-compressed during installation and operation to create thousands of tortuous paths through which water must flow during filtration. During filtration, the tortuous paths entrain and remove particulates, such as suspended solids, as the solids become trapped in the multiple layers and folds of the LFMs 10. After the LFM becomes dirty from use as a filter due to its entrainment of particulates, the LFM mass is allowed to separate and expand in order to be cleaned either by manual means or hydraulic turbulence or by a separate washer device. It is also understood that other shapes constructed from LFM material, such as a square or oblong shape, can be used with the filters described herein. For example, a flexible, flat sheet structure made of LFM material may be configured instead of separate filter balls to accommodate different filter configurations and ease of manufacturing and assembly.

When a differential pressure of 10 to 15 psi is reached or, alternatively, according to a pre-determined timed schedule, the LFMs 10 are either 1) removed from their housing for manual cleaning (See FIGS. 3A-B, 4A-D); 2) are cleaned in-situ with an automated and turbulent backwashing method (See FIGS. 5A-7); or 3) are cleaned automatically in a system utilizing a separate washer device (See FIGS. 8A-8D).

The LFM filter of the instant invention uses a multitude of individual LFM balls 10 that are pre-compressed before and during filtration to make one larger, higher flow, filter media mass 16. The amount of compression dictates the level of filtration. The LFMs 10 are relaxed during backwash and cleaning in order for entrained particulates to be accessible for removal. Seven individual LFMs 10 are shown in FIG. 1 next to a ruler 12, as noted above, for scale. According to the instant invention, the method of use involves the pre-compression of the LFMs 10 to create a single, densely-packed filter with thousands of tortuous paths to produce excellent filtration in a very lightweight package without using complicated, cumbersome, and relatively expensive mechanical devices.

During filtration, those tortuous paths entrain and remove particulates, such as suspended solids, as the solids become trapped in the multiple layers and folds of the LFMs 10. The invention involves a compression of the LFM filter balls 10 by either: 1) manual pre-compression (See FIGS. 3A-3B and 4A-4D); or 2) hydraulic auto pre-compression using the force of water flow on a pre-compression plate (See FIGS. 5A-5B, 6, 7). Also contemplated within the instant invention are methods to automatically clean the LFM filter media by either: 1) an auto backwash method inside the filter housing that activates periodically due to differential pressure or a timed schedule (See FIGS. 5A-5B, 6, 7); or for higher filtration flows 2) an automatic cleaning system that removes the LFMs from their filter housing periodically due to a timed schedule or differential pressure and cleans and rejuvenates the LFMs in a separate washer device for return to the filter housing at a later time (See FIGS. 8A-8D).

Figure 2:
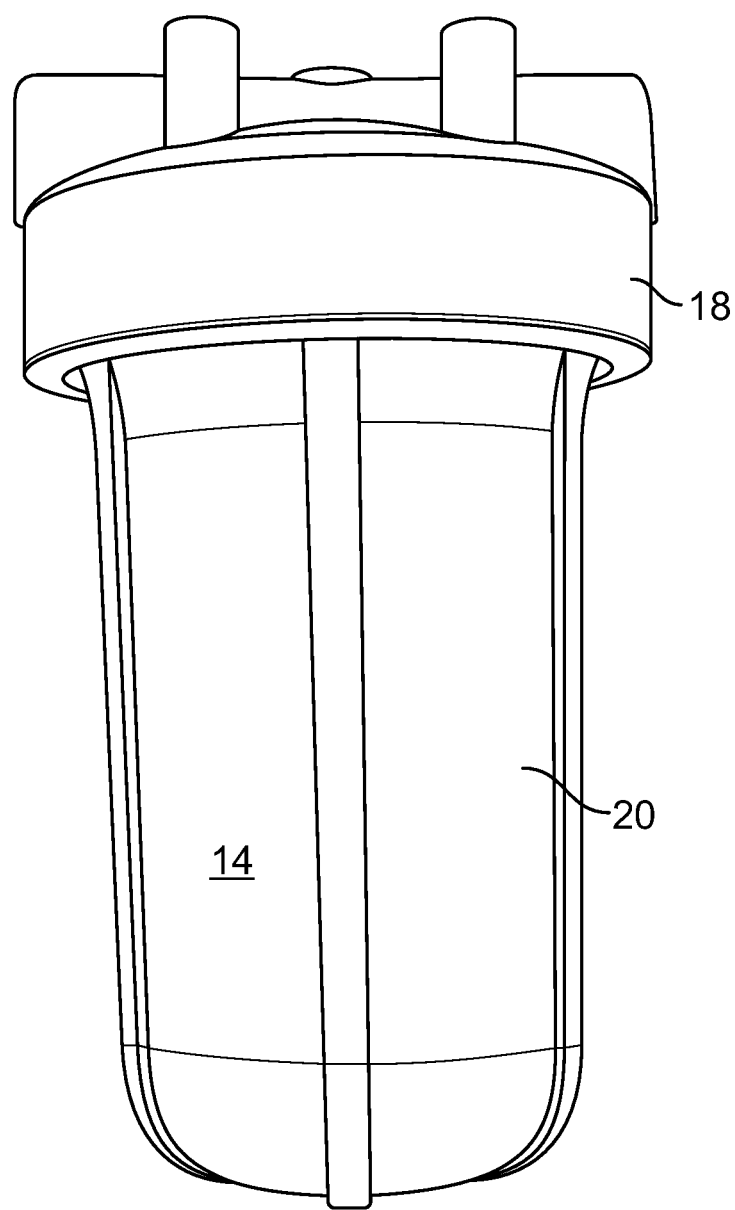
FIG. 2 is a side view of a typical lightweight fibrous media filter housing that contains a nominal ten-inch cartridge or basket device to hold the LFM.

The manual pre-compression is contemplated for use inside of a pressure-holding filter housing 14 (See FIG. 2) used to accept either: LFM balls directly (See FIG. 3A), or a filter cartridge (See FIGS. 4A- and 4B), or a bag filter basket (See FIGS. 4A and 4C) or a combination filter using LFM material surrounding an inner cartridge filter (See FIG. 4D), or an in-line housing configuration (See FIG. 3B). In these embodiments, the LFMs 10 are manually pre-compressed during installation in a variety of ways inside an outer housing 14 that is designed to hold the pressure of feed-water and prevent water from bypassing the LFM filter mass 16. A commercially-available 10-inch long outer housing 14 is shown in FIG. 2 which can be used for this purpose. Similar housings are typically in the 10-inch and 20-inch lengths, although any length is possible. The LFMs used in a manually pre-compressed housing are manually removed from their housing and allowed to separate and expand for cleaning on an "as-needed" basis.

Figure 3A:
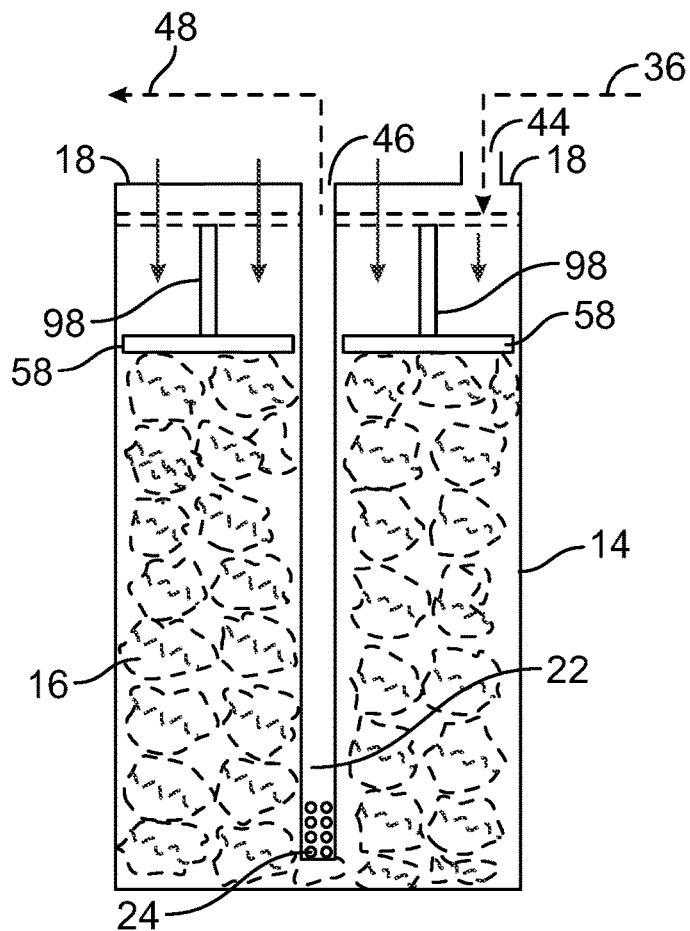
FIG. 3A is a cross-sectional view of the filter of the instant invention showing the pre-compressed lightweight fibrous media placed inside a filter housing with an internal filtered water outlet tube through the center wherein closing the top of the housing pre-compresses the LFM by use of a pre-compression plate device with a fixed distance stand-off from the inside of the filter top.

FIG. 3A shows a schematic diagram of a manually pre-compressed, filter-style housing configuration that does not utilize an inner device, such as a cartridge or basket to pre-compress the LFMs. In this case, the LFMs 10 are randomly placed inside the housing 14 and when the top of the housing 18 is screwed onto its base, the LFMs 10 become pre-compressed due to the use of a pre-compression plate 58 inside of the housing shown in FIG. 3A. The pre-compression plate 58 is held in place with a pre-determined level of compression in FIG. 3A and pushes down onto the LFM balls by one of three methods or a combination of the three methods: 1) by the use of a fixed distance standoff device 98 placed between the LFM filter mass 16 and the top of the filter housing 18 as shown in FIG. 3A, 2) by means of hydraulic force as water flows through the housing and pushes on the plate 58, 3) by the weight of the plate 58, itself pushing down due to gravity in a vertical orientation. FIGS. 3A, 4A, 4B and 4C show the option of having a perforated filtered water tube 22 with a plurality of apertures 24 attached in its center to allow filtered water to exit the housing without by-passing the LFM media mass.

Figure 3B:
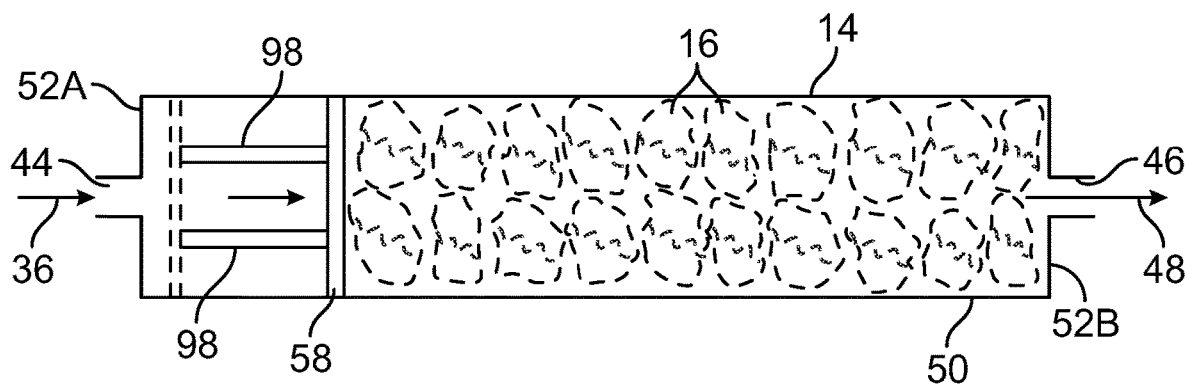
FIG. 3B is a similar embodiment as FIG. 3A but without a central filtered water outlet tube in a typical "in-line" filter orientation wherein the closing of the ends pre-compress the LFM by use of a pre-compression plate device with a fixed distance stand-off from the inside of the filter top.

FIG. 3B shows an in-line housing for the simplest form of an LFM filter 10. In FIG. 3B, the LFMs 10 are placed inside the in-line housing 50 with no inner device to hold the LFM. When the ends 52A, 52B of the in-line housing 50 are fitted in place, the LFMs 10 become pre-compressed in a similar fashion as FIG. 3A due to the use of a pre-compression plate 58 inside of the housing shown in FIG. 3B. The pre-compression plate 58 is held in place with a pre-determined level of compression in FIG. 3B and pushes down onto the LFM balls by one of three methods or a combination of the three methods: 1) by the use of a standoff device 98 placed between the LFM filter mass 16 and the end of the filter housing (shown in FIG. 3B), 2) by means of hydraulic force as water flows through the housing and pushes on the plate 58, 3) by the weight of the plate 58, itself pushing down due to gravity in a vertical orientation. The ends 52A, 52B of an in-line housing 50 can either be removable (if the LFMs are meant to be cleanable) or glued in place (if the LFMs are not meant to be cleanable). In FIGS. 3A, and 4A-4C the LFMs 10 are intended to be manually removed, cleaned and replaced inside their housings.

Figure 4A:
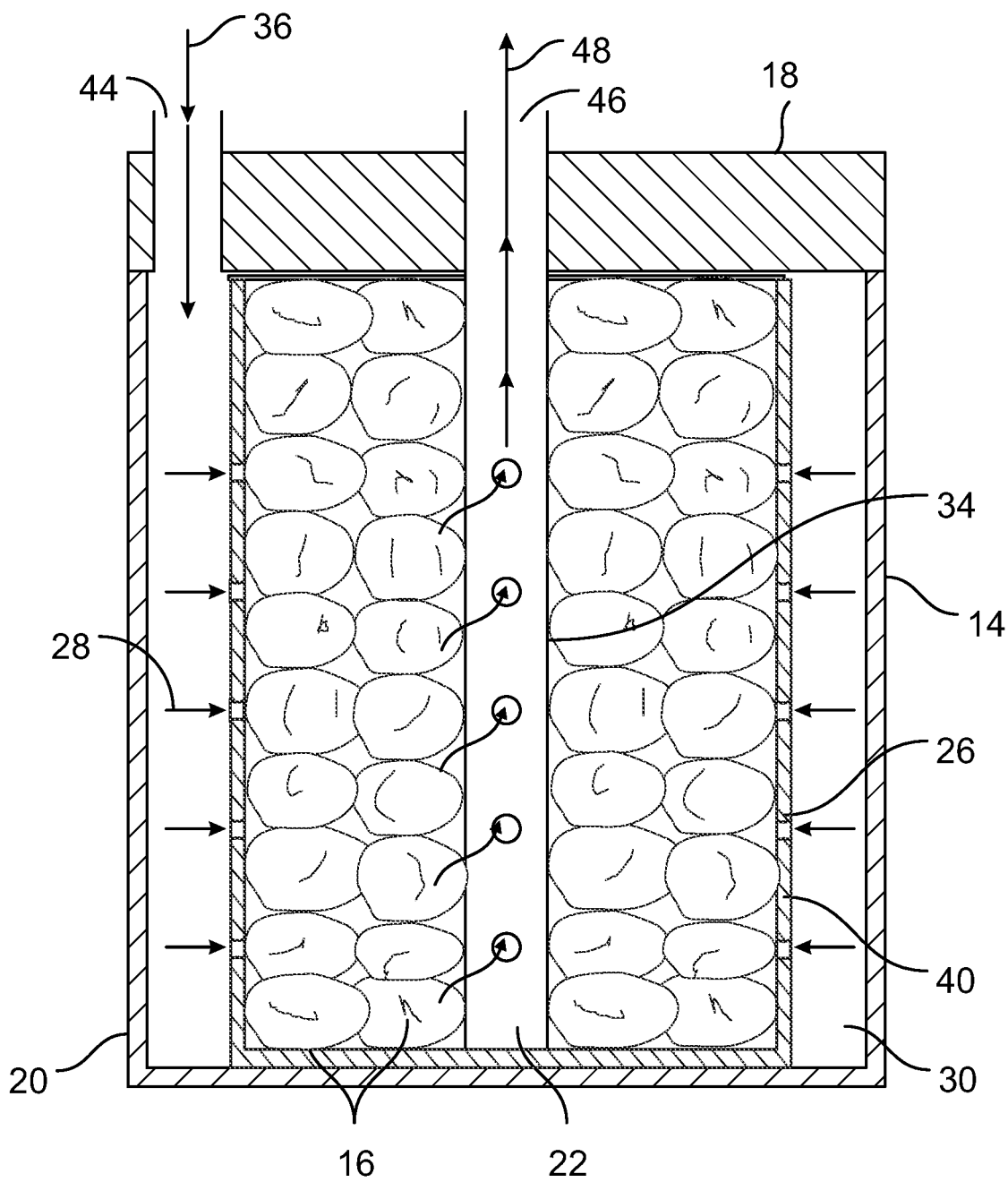
FIG. 4A is a cross-sectional view of an alternate embodiment of the lightweight fibrous media filter of the instant invention wherein the LFM filter media is pre-compressed by pre-installing into either a filter cartridge or a perforated basket that is then installed into an outer housing during filtration and use.
Figure 4B:
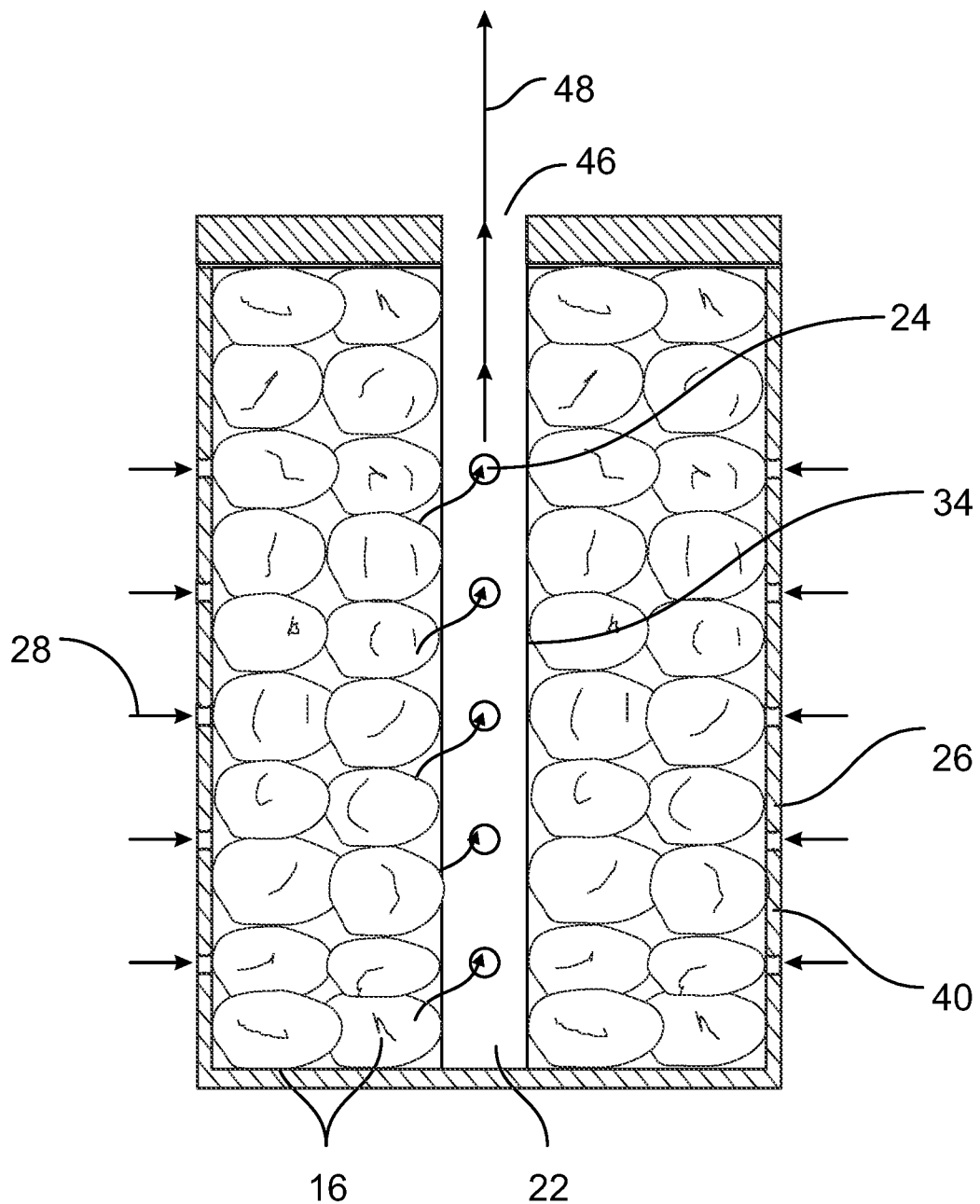
FIG. 4B is a cross-sectional view of the embodiment shown in FIG. 4A but wherein the filter cartridge is not placed inside of an outer housing.

FIGS. 4A and 4B show the LFM filter balls 10 are pre-compressed inside a separate open mesh cartridge assembly 26 before being installed within the outer filter housing 14 that may or may not utilize a removable top 18. A separate LFM 10 cartridge 26 is also shown in FIG. 4D outside of its outer housings for clarity of discussion. As shown in FIG. 4D, the open mesh filter cartridge assembly 26 allows raw water to enter the cartridge in a radial flow pattern 28 in the annular space 30 formed between the outer surface of the open mesh filter cartridge assembly 26 and the inner surface of the outer filter housing 14. The outer sides of the cartridge assembly 26 includes a series of perforations 40 through which water can radially flow 28 into the LFM filter ball mass 16. Filtered water that has traveled through the LFM filter ball mass exits the filter through an inner filter 100 that contains a center tube allowing water to exit and therefore the inner filter 100 takes the place of the center tube previously described in FIGS. 4A, 4B and 4C that is an internal component of the cartridge assembly. In this case, the LFM filter balls are used in a single filter configuration that combines the performance of two distinct filters: a media filter (created by the LFM filter balls) with the known micron removal of an inner filter functioning as a cartridge filter with specified micron separations. In this particular configuration, the LFM material will act as a pre-filter to reduce particulate loading on the inner filter, especially useful for use with absolute-rated filters that are prone to particulate "blinding" and premature fouling. Also, the LFM filter ball mass 16 can be removed from the filter cartridge 26 periodically for cleaning if the ends of the cartridge 26 are removable. In that case, the LFM filter ball mass 16 can be manually cleaned after they are removed from the cartridge assembly and, once cleaned, manually returned to the cartridge for re-installation into the outer housing. However, all LFM Filters can be configured to be disposable without the feature that the LFM filter balls are removable for cleaning.

Figure 4C:
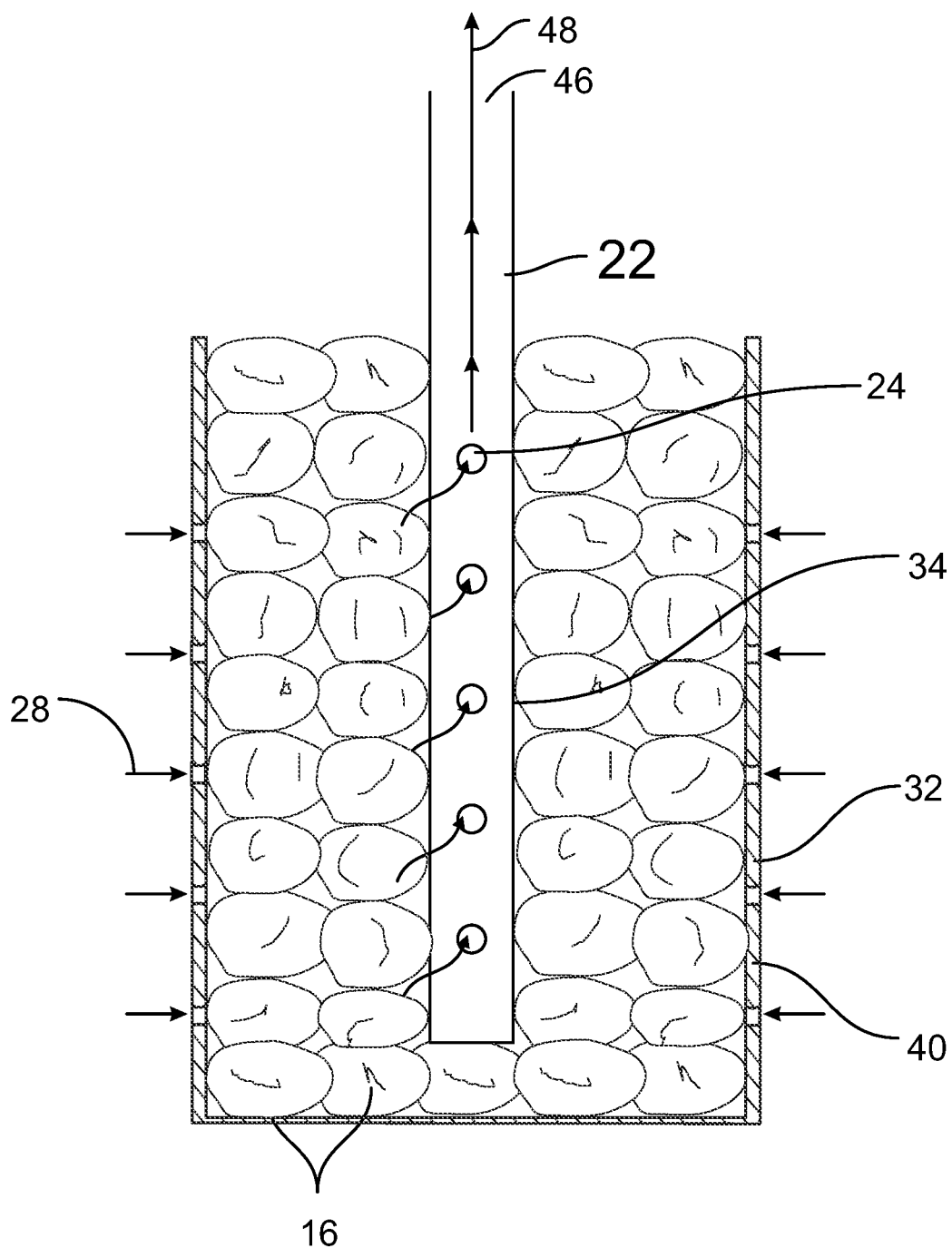
FIG. 4C is a cross-sectional view of the embodiment shown in FIG. 4A but wherein the perforated basket is not placed inside of an outer housing.
Figure 4D:
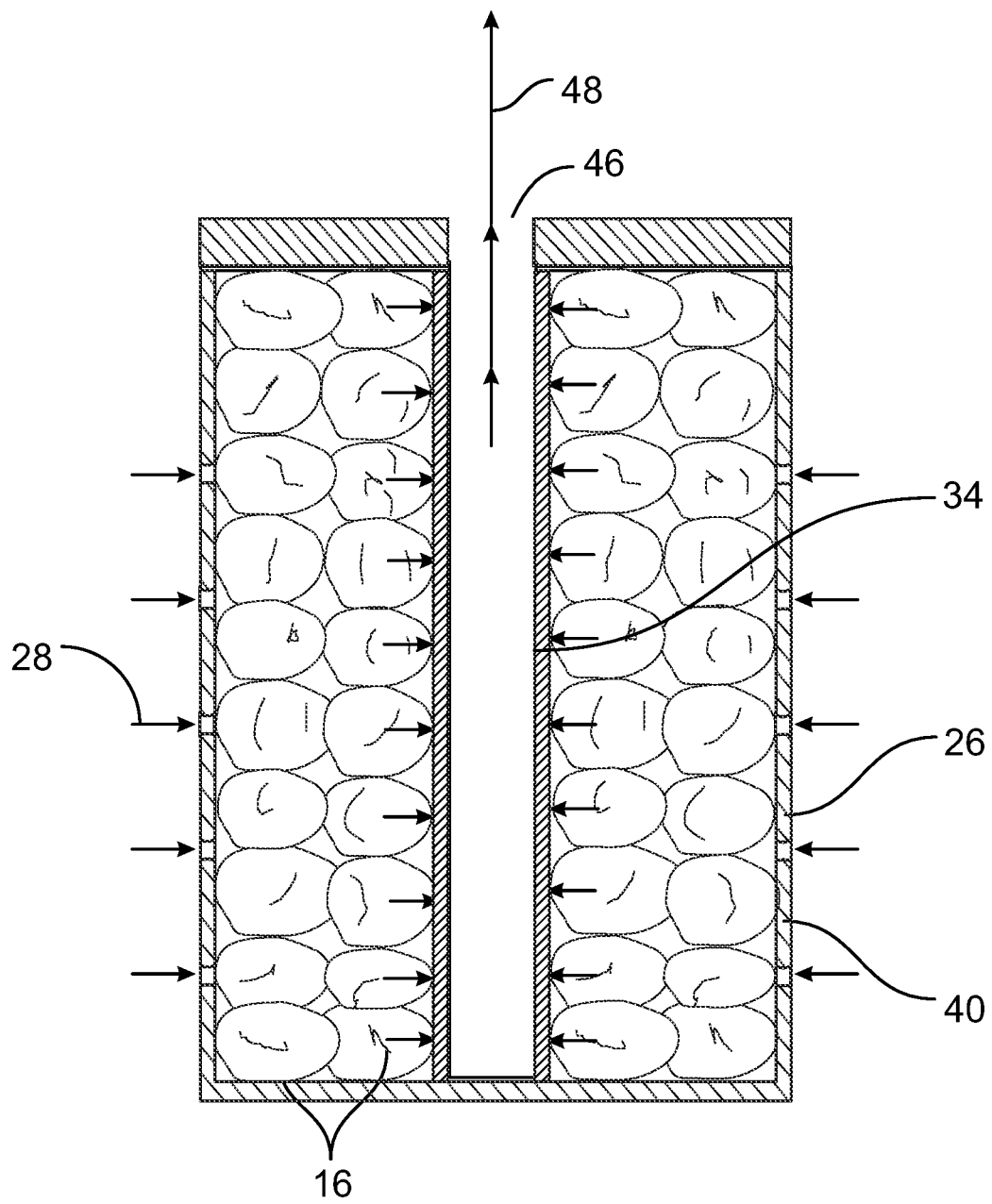
FIG. 4D is a cross-sectional view of the embodiment shown in FIG. 4A but wherein an inner filter of known micron rejection with internal perforated tube has replaced the perforated tube shown in FIGS. 4A and 4B and is placed into said LFM mass for the movement of water therethrough.

FIG. 4C shows the use of an open mesh basket that does not utilize a cartridge, but instead contains an inner basket 32. When the basket is installed inside a filter outer housing, this embodiment looks identical to FIG. 4A, but in this case, the LFMs 10 are pre-compressed inside an open-top inner basket 32 that is then installed within the outer housing 14. This configuration is similar to a typical bag filter housing that uses an inner basket to hold the expanding bag during pressurized filtration. In this configuration shown in FIG. 4C, utilizing an internal basket 32, the inside of the housing top 18 will contain a sealing apparatus that mates perfectly with the top of the basket in order to seal the LFM mass inside the housing and eliminate bypass of raw water. In addition, the inside of the housing top 18 will also have an attached perforated filtered water tube 22 to allow filtered water to exit the LFM media pack. In FIG. 4C, the filtered water tube 22 is shown truncated because its attachment to housing top 18 is not shown. During installation, LFMs are manually pushed into the basket and then the perforated filtered water tube 22, typically attached to the filter top 18, is pushed down through the center of the LFM mass. The top of the basket 32 is open, but will be sealed once the housing top 18 of the outer housing 14 is screwed into place. When the basket 32 is removed from its outer housing 14, the LFMs 10 can be removed periodically for cleaning. Once cleaned, the LFMs 10 can be returned to the basket 32 for reuse. When installed into a filter housing 14, the open mesh basket 32 also allows raw water to enter the basket 32 through the annular space 30 in a radial flow 28 pattern, in the same manner as the cartridge 26 previously described.

In the configurations illustrated in FIGS. 4A-4C, there exists an open mesh inner basket 32 or open mesh cartridge assembly 26 with a perforated filtered water tube 22 in the center with a plurality of apertures 24 found therein. LFM filter balls 10 are squeezed inside the basket 32 or cartridge 26 and along the length on the outside 34 of the filtered water tube 22 in a pre-determined quantity to produce a pre-determined filtered water quality. Un-filtered water 36 flows through an inlet opening 44 and into an annular space 30 around the outside of the perforated basket 32 or open mesh cartridge assembly 26 and enters the LFM media mass 16 in a radial-flow direction 28 from outside of the basket 32 or open mesh cartridge assembly 26. In similar fashion, FIG. 4D shows a cartridge assembly 26 that contains LFM material surrounding an inner cartridge filter layer 100 of known micron separation containing its own filtered water tube in its center.

Water and particulates travel through the relatively large openings of the basket 32 or open mesh cartridge assembly 26 which are holding the LFM filter ball mass 16 and particulates get caught in the thousands of tortuous paths inside the compacted LFM filter balls 16. Water continues through the LFM filter ball mass 16 and flows into one of the perforations 24 of the filtered water tube 22 (or 100) in the center of the filter configuration. From the central perforated tube 22 (or 100), filtered water exits in an outward flow 48 through an outlet opening 46 from the housing 14.

This configuration creates a manually pre-compressed and manually-cleaned filter where the LFM filter ball mass 16 is removed periodically to clean. A pre-determined number of LFM filter balls 10 placed into the housing 14 between the basket 32 or open mesh cartridge assembly 26 and the inner filtered water tube 22 will dictate the level of pre-compression and therefore the level of filtration and consequently, turbidity removal. As an example, 40 LFM balls, shown in FIG. 1, are placed inside a typical 10-inch housing, shown in FIG. 2, holding a cartridge or basket as shown in FIGS. 4A-4C.

While the LFM filter ball mass 16 is in operation and removing particulate matter from a water stream, it will build up a differential pressure within its media bed due to particulates accumulating inside the LFM filter mass 16, like all media filters. In this configuration, once differential pressure rises to a pre-determined level, such as 10-15 psi, or according to a pre-determined timed schedule, the individual LFM filter balls 10 can be removed from the housing 14, manually cleaned by hand or a washing machine, and then replaced and reused indefinitely. However, it is understood that a cartridge filter configuration may be used that does not have removable ends and therefore does not have the capability to allow removal of LFM material for subsequent cleaning and reuse.

The use of relatively small, individual LFM filter balls 10 makes manual cleaning very effective and complete, unlike conventional, rigid-configuration cartridge filters. Separate filter balls 10 allow for complete cleaning of each LFM 10 inside and on its surface, unlike other filter designs, such as standard cartridge filters. As proven during long-term testing, the LFM filter of the instant invention represents a permanent media mass 16 that can be cleaned periodically over and over again for an indefinite period of time. It is also understood that LFM filter balls that are larger or smaller than those shown in FIG. 1 can be used with the filters described herein. It is also understood that other shapes constructed from LFM material can be used with the filters described herein. For example, a flexible, flat sheet structure made of LFM material may be configured instead of separate filter balls to accommodate different filter configurations. For example, a flexible flat sheet LFM configuration would allow LFM material to be wrapped around the outside of a center tube (22 of FIGS. 4A-4C and 100 of FIG. 4D) for ease of manufacturing and assembly.

The fact that the LFM filter media 16 is very lightweight, compact, and can be cleaned repeatedly, makes it an excellent candidate technology for mobile water treatment systems, especially for use in remote and challenging locations where resupply of filter replacements may not be feasible. These features are especially important for applications that include military combat locations and disaster relief operations. However, if resupply is not a limiting factor, the LFMs 10 can, of course, be removed and replaced, if desired, like an ordinary disposable filter cartridge.

The FIG. 4A-4D configurations allow for a preferred radial flow 28 direction of raw feed water into the LFM media mass 16. In FIGS. 4A-4D, LFMs 10 are shown installed and pre-compressed to form a single filter mass 16 inside their respective cartridge and basket assemblies, and all the outer housings are designed to withstand water pressures.

The pre-compression methods shown in FIGS. 4A-4D include an inner cartridge 26 or an inner basket 32, showing one filter in one housing. It is also envisioned that multiple pre-compressed cartridges or baskets could be used in a larger, single housing when higher flows are required. This would save space and allow faster removal of LFMs 10 when they must be replaced or undergo a cleaning process.

Figure 5A:
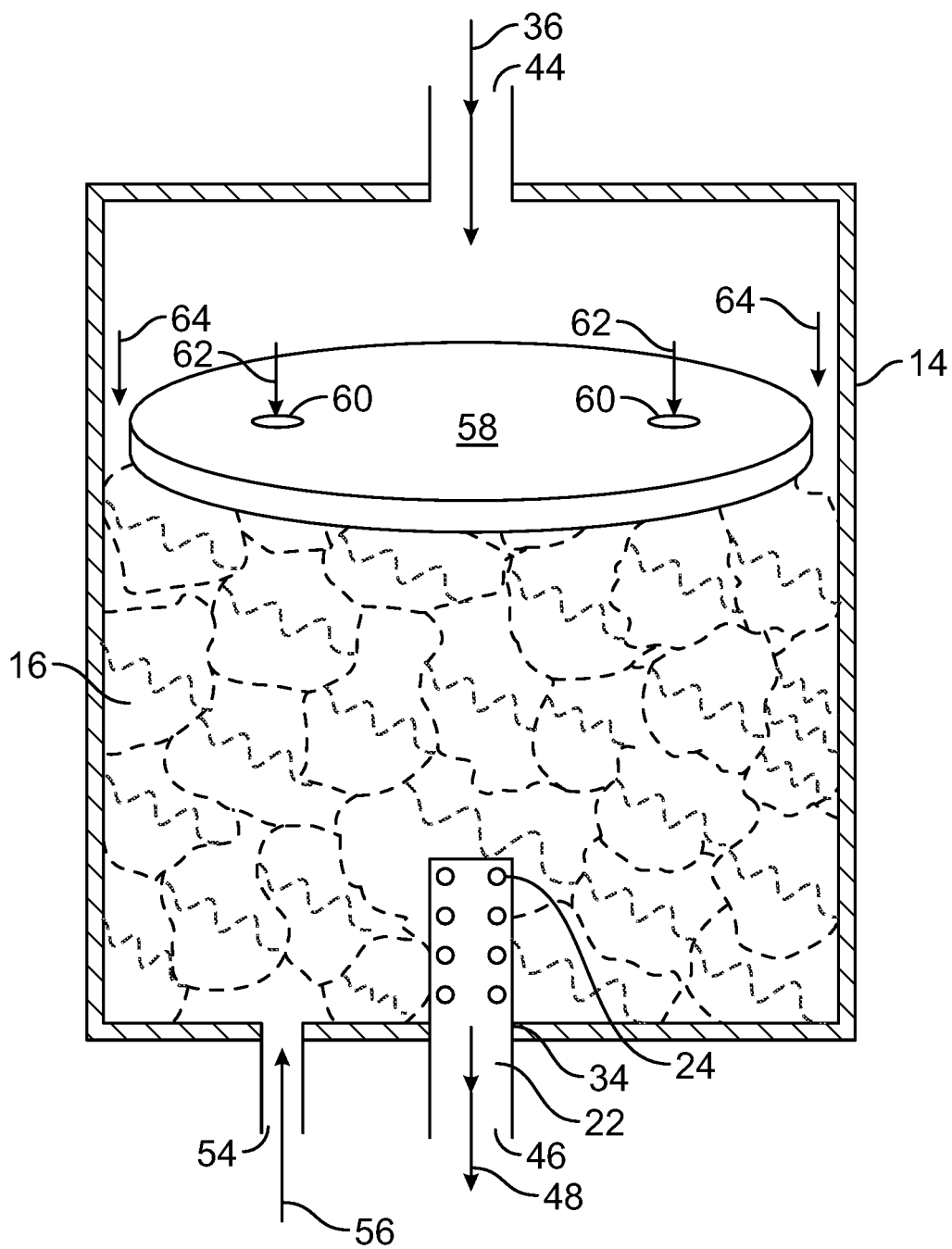
FIG. 5A is a cross-sectional view of an alternate embodiment of the lightweight fibrous media filter of the instant invention wherein a hydraulic pre-compression plate with the capability of automatic backwash is incorporated therein that uses a down flow filtration orientation.

The alternate embodiment incorporating an auto pre-compression in an in-situ cleaned configuration is illustrated in FIGS. 5A-7) In addition to the manually-cleaned filter embodiments described above, the LFM filter balls 10 can be backwashed and cleaned in-situ automatically with a combination of turbulent water and air injection. This back-washing technique is initiated periodically to prevent the LFM filter balls from becoming too dirty from entrained particulates. For example, this process can pre-set to occur every 1-4 hours. In comparison, manual cleaning of LFM balls usually occurs every 1-7 days, depending upon raw water quality. FIGS. 5A-5B show two possible auto-cleaned configurations that use two different flow directions. In FIG. 5A, the flow direction during filtration is downward while in FIG. 5B, the flow direction during filtration is radially inward. In both configurations, the LFM balls 10 are cleaned in-situ and not removed from their housing during the cleaning process.

Figure 6:
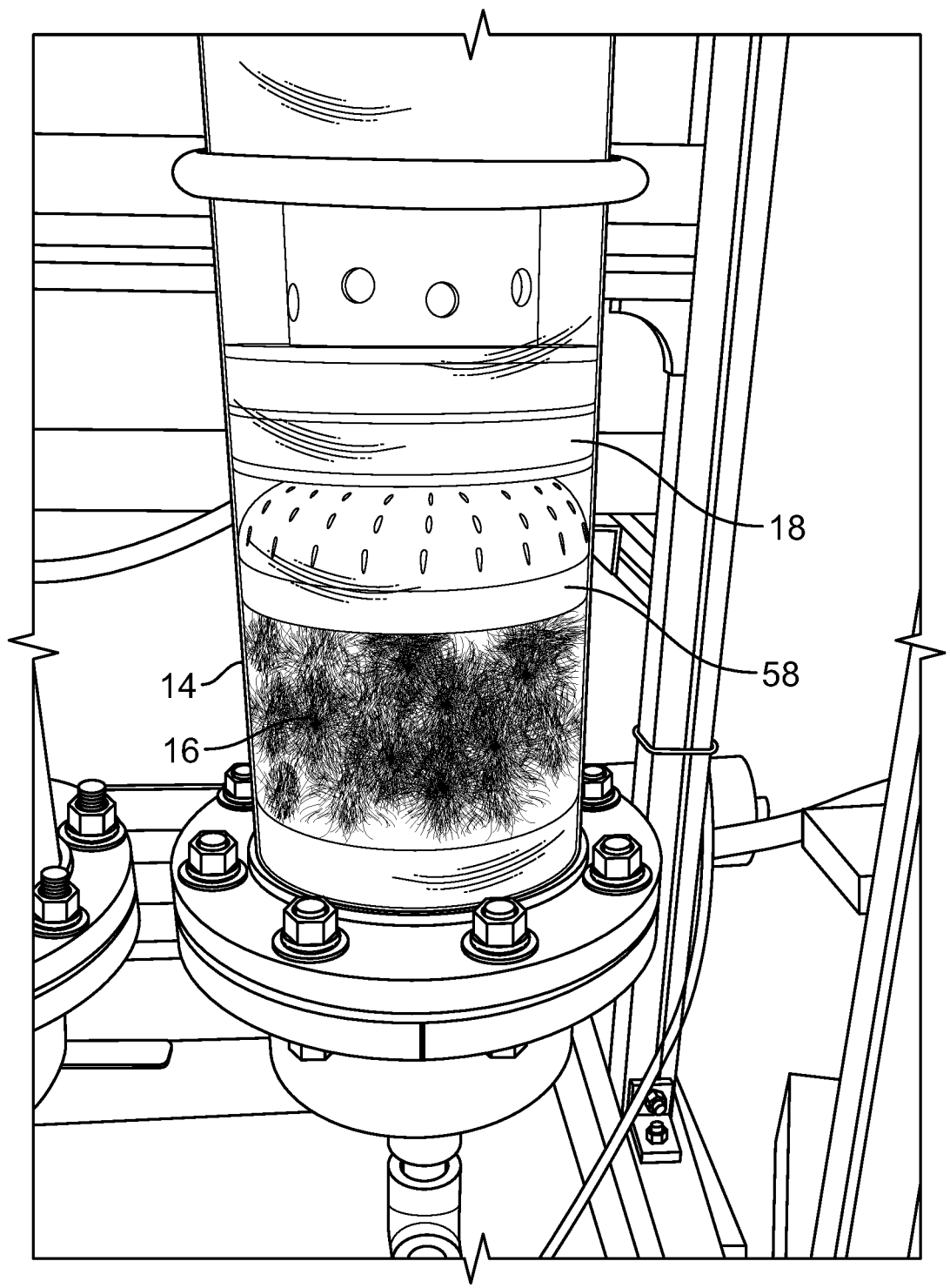
FIG. 6 is a side view of the embodiment shown in FIG. 5A showing the filtration mode in a system as a whole.
Figure 7:
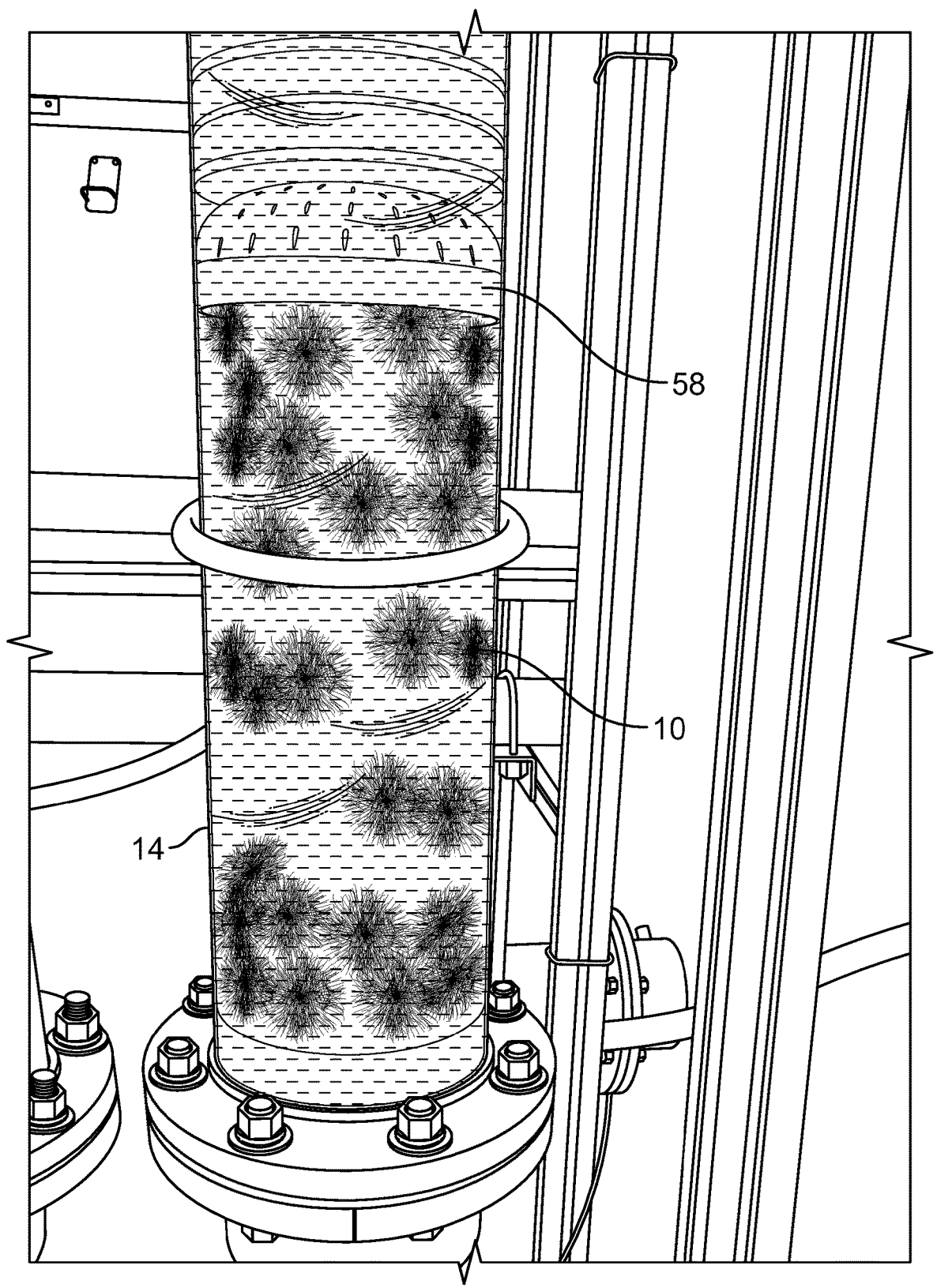
FIG. 7 is a side view of the embodiment shown in FIG. 6 showing the backwash mode in a system as a whole.

FIGS. 6-7 show the system in context rather than schematically of an auto-backwash LFM filter. FIG. 6 shows the filtration stage and FIG. 7 shows the backwash stage. A downflow configuration is shown schematically in FIG. 5A. In this figure, a hydraulic pre-compression plate 58 pushes down onto the LFM balls 16 located below the plate 58 whenever raw water flows 36 through the housing. Raw water flows around the edges 64 and/or through 62 optional holes 60 in the body of the pre-compression plate 58 to the area below containing the randomly-packed LFM filter mass 16. The hydraulic pre-compression plate 58 compresses the LFMs 10 because the plate 58 is solid enough to cause water to move it in the direction of waterflow 62 as water pushes against its body 58 and water flows around the edges 64 of the plate 58 and/or through optional holes 60 in the plate 58. As a result, the pre-compression plate 58 compresses the individual LFMs 10 into a single filter-pack 16 whenever water flows through the housing. A small center perforated tube 22 with a plurality of perforations 24 allows filtered water 48 to exit at the bottom 46 of the LFM filter housing. Periodically, water flow is reversed 56 and air is introduced near the bottom 54 of the housing which causes the pre-compression plate 58 to rise because of the upward water flow 54. Once the pre-compression plate 58 rises, the LFM balls 10 expand due to the water and air mixture and entrained particulates become accessible for removal from the LFM balls 10 due to the turbulent action caused by the combination of backwash water and air.

Figure 5B:
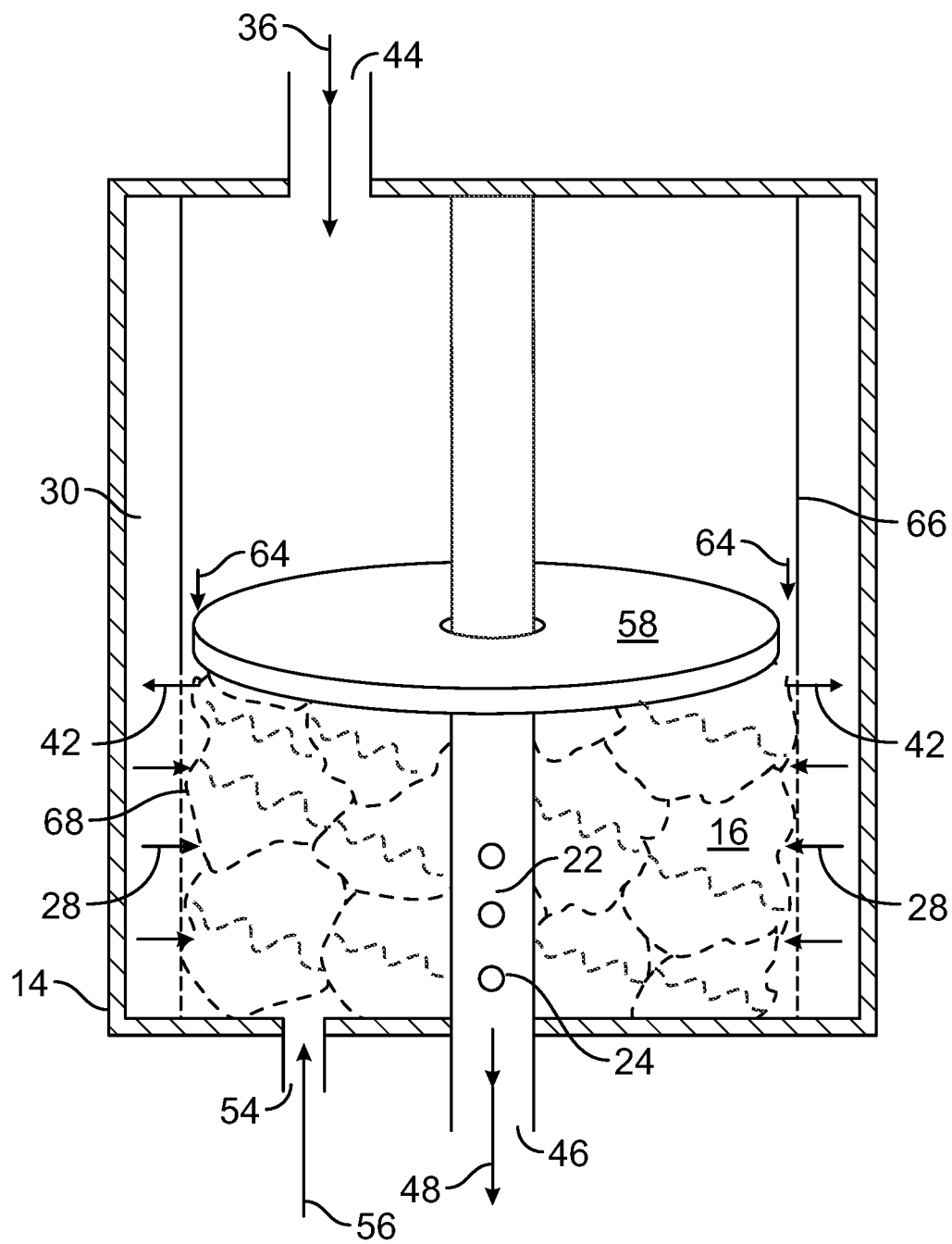
FIG. 5B is a cross-sectional view of another embodiment of the lightweight fibrous media filter with the capability of automatic backwash that uses a radial flow filtration orientation.

In the LFM filter radial flow auto-backwash configuration shown schematically in FIG. 5B, a hydraulic pre-compression plate 58 pushes down onto the LFM mass 16 located inside a center cylinder 66 as a result of water flow. In order to make this occur as a result of hydraulics, the center cylinder has an upper section that is solid and a lower section that is perforated. Raw water flows down the inside of the solid surface section of the center cylinder 66 causing the pre-compression plate to move downward in the same manner as the down flow configuration shown in FIG. 5A. But once the raw water flow enters the lower perforated section, raw water 42 flows radially outward into the annular space through the top of the perforations and the pre-compression plate will stop moving downward at that point. The beginning of the perforations in the center cylinder will therefore dictate the level of pre-compression that is meant to be imparted into the LFM filter mass 16. Once raw water flows into the annular space between the perforated center cylinder and the inside of the outer housing, it will change direction and flow in a radial flow direction 28 into the LFM mass 16 in order to access the inner perforated pipe as filtered water before exiting the housing.

The LFM mass 16 surround a center perforated tube 22 with a plurality of perforations 24 that allows filtered water 48 to exit the LFM filter housing. Periodically, water flow is reversed 56 and air is introduced near the bottom 54 of the housing which causes the pre-compression plate 58 to rise because of the upward water flow 56. Once the pre-compression plate 58 rises, the LFM balls 10 expand due to the water and air mixture and entrained particulates become accessible for removal from the LFM balls 10 due to the turbulent action caused by the combination of water and air.

The LFM auto-clean system embodiment of the instant invention is shown in FIGS. 8A-8D. The is a system to clean LFM filter media 16 automatically, outside of their filter housing 70 in order to utilize a robust and aggressive external washer device that would not be possible to create inside an LFM housing. This configuration would especially be suitable for high flow systems and could accommodate virtually any flow rate including 1,000 gallons per minute and larger. This method is possible because LFM filter media 16 is made up of individual filter balls 10 that are relatively small and lightweight and therefore can be pumped through a conduit hose by means of water flow or vacuum from one area/container to another. It is envisioned that multiple LFM housings would be connected to a single washer device, but for ease of description, one housing is connected to one washer device as shown in FIGS. 8A-8D. The auto-clean system starts with two sets of LFM balls 10 per LFM housing. The first set is located in the filter housing 70 which, as described above in the earlier embodiments and shown in FIGS. 5A, 5B, 6, and 7, includes a water inlet 44, a compression plate 58, a water outlet 46 proximate the perforated tube 22 and an inlet 90 for water and air to be introduced to raise the compression plate 58. The second set is located in a standby container 72, both containers being connected by a conduit 76 that includes a pump 78 and a valve to open and close the flow. Note: there would be a multitude of valves used for the various water inlets and outlets used with the components shown in FIGS. 8A through 8D. However, valves are not shown because they would reduce the clarity of the schematics and are not necessary to convey the meaning of the auto-clean system.

One set of LFM filter media 16 is used in filtration with pre-compression as described previously in this patent application and shown in FIGS. 5A, 5B, 6, and 7. The filter housing 70 contains an additional inlet and conduit 76 and outlet and conduit 82 each with a valve that opens and closes by means of an electrical or pneumatic mechanism and control. The second conduit 82 connects the filter housing 70 and the LFM washer device 74 that also includes a pump 84 and a valve. (See FIGS. 8A-8D.)

Figure 8A:
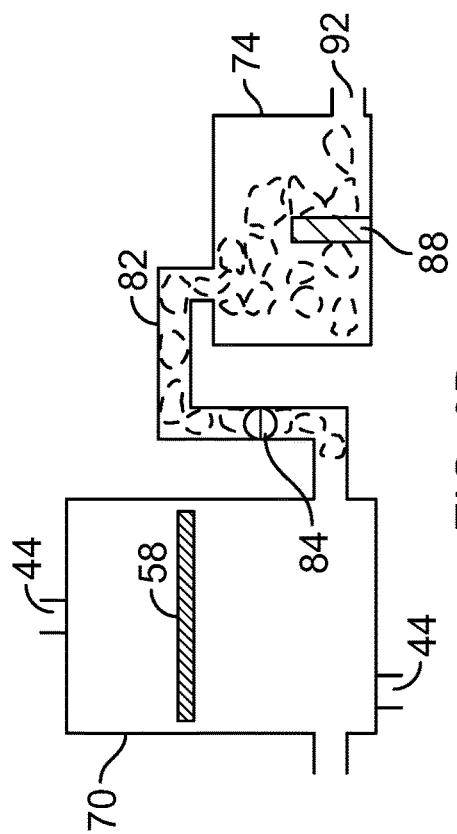
FIG. 8A-8D show a schematic view of an alternate embodiment of the lightweight fibrous media filter of the instant invention in the filtration mode of an auto-clean system configuration for high-flow applications. Note.
Figure 8B:
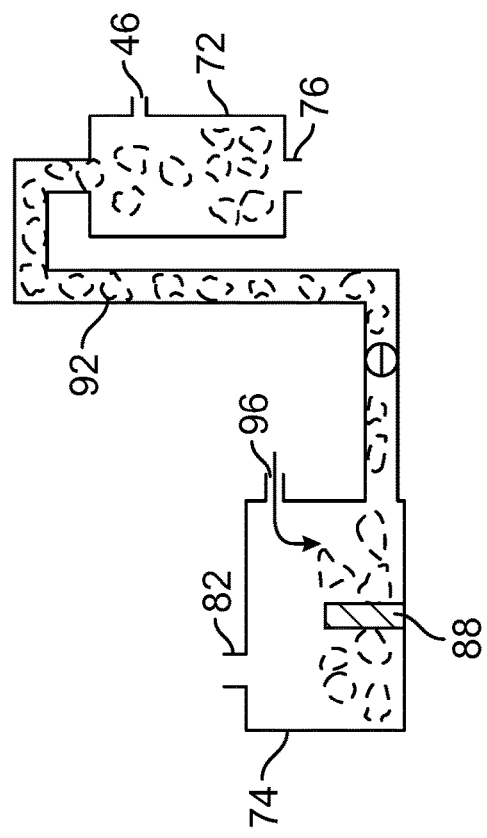

According to a timed schedule or when a differential pressure builds up to a nominal 10-15 PSI, the LFM filter balls 10 are not cleaned in their housing as previously described and shown in FIGS. 5A, 5B, 6, and 7. Instead, as shown in FIG. 8B, they are transported by means of water flow or vacuum created by a pump 84 through a hose 82 to an adjacent washer device 74. The washer device 74 is specifically designed to impart significant agitation to the LFM material 10 in the same manner as a washing machine imparts agitation to clothes with an agitator 88. Creating agitation in a device outside the filter housing 70 allows the washer device 74 to be designed with one or more robust agitators 88 that are able to create greater turbulence than would be possible inside a filter housing 70. It also facilitates the use of cleaning aids, such as detergents to be used in an LFM wash-cycle.

Figure 8C:
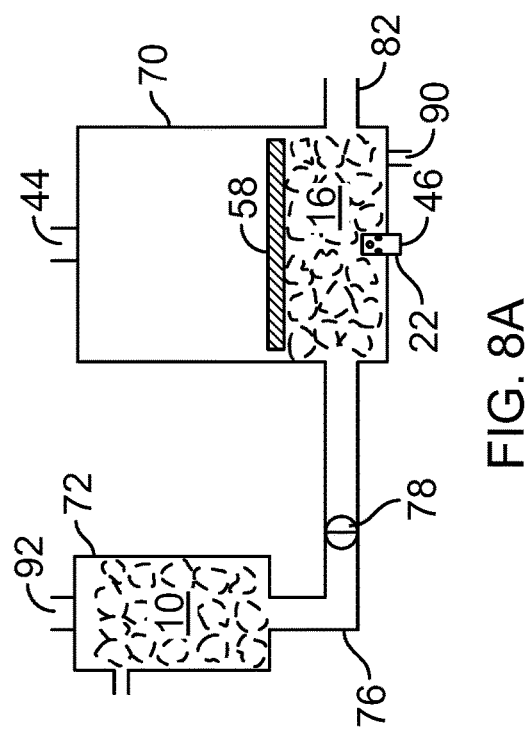

As soon as the LFM balls 10 are removed from their filter housing 70 as shown in FIG. 8B, new/previously washed LFM balls 10 are transported by means of water flow 94 through a hose 76 from a standby container 72 back into the filter housing 70 as shown in FIG. 8C. Replacement of the LFM material 10 in the filter housing 70 will allow the filter to go back online with very little downtime, approximately on the order of 5-minutes after removing the dirty LFM balls described above.

Figure 8D:
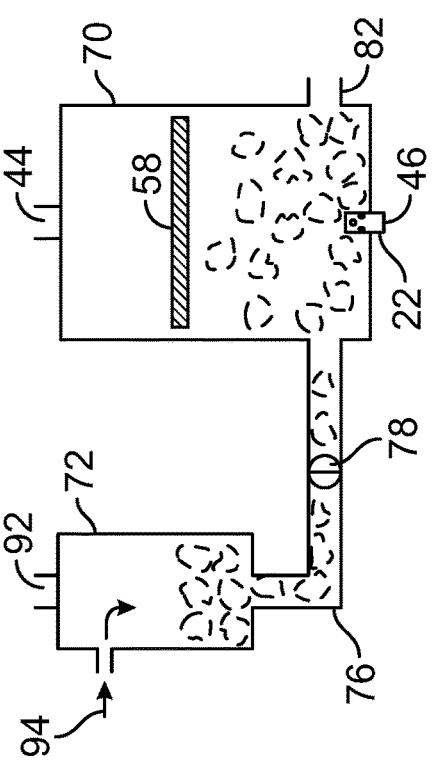

The LFM balls 10 are cleaned in the washer device 74 by means of very turbulent agitation. As shown in FIG. 8D, once the LFM balls 10 are washed and rinsed, they will be transported again by means of pumped water flow 96 or vacuum through a hose 92 to an adjacent standby container 72 designed to store clean LFM balls 10. Eventually, the clean LFM balls 10 will be transported back to the filter housing 70 when they are needed to replace the set of LFM balls 10 after becoming dirty from operating in the filter housing 70.

With the auto-clean system designed for LFM filter media 10, it can be envisioned that multiple filter housings 70 may be connected to a single washer device 74. In an operational scenario using multiple filter housings 70 and one washer device 74, a sequence of LFM cleanings initiated based upon time, and not differential pressure, would probably be most effective. Although differential pressure initiation of LFM cleanings is also possible.

The key to the filter designs described herein is that the individual LFM filter balls 10 are pre-compressed either 1) manually (in an outer housing with a fixed pre-compression plate 58, or a pre-compressed cartridge assembly installed in an outer housing, or a pre-compressed basket installed in an outer housing, or in an in-line housing with a fixed pre-compression plate 58 or 2) by means of a hydraulic pre-compression plate 58 shown in FIGS. 5A-B, 6, 7, and 8A-D. The use of a hydraulic-activated pre-compression plate 58 allows automated backwashing to occur where densely-packed LFM filtration media 16 can be cleaned periodically in-situ with a combination of backwash water flow and air injection. Alternatively, the LFM filtration media 10 can be removed from their filter housing periodically via pumping or vacuum and sent to a separate washer device 74 for cleaning, and return to their filter housing 70 at a later time.

With a weight of only 5-ounces per filter set, the LFMs represent a very lightweight filter media. In order to put this weight into perspective, the level of filtration of an LFM filter (with a 5-ounce weight) represents the equivalent of a conventional media filter that contains about 20 pounds of granular (sand) media. Therefore, the LFM media represents a 98% reduction of weight compared to standard sand filter media. For this reason, the LFM filter is considered ideal for mobile water treatment systems where a lightweight and compact pre-filter is desired. It is the intent of the invention to allow the simplicity of the LFM to be used for moderate and low flow water treatment systems that are typical of mobile applications used by military and disaster relief operations.

In addition to removing water-borne particulates, the LFM filter material will also remove oil from water by coalescing small oil particles into larger particles when the synthetic material used to make the LFM filter media has an inherent affinity/attraction for oil. Such synthetic materials include: polyethylene and polypropylene, but there are many more such materials with an affinity for oil. The LFM filter will therefore function as an oil-coalescer and oil/water separator. An oil/water separator will be cleaned in the same manner as the particulate filters described previously. Drawings 5A-7 show a pre-compression plate that moves down to compress the LFM Filter balls during filtration. It is understood that it may be useful for the pre-compression plate to move upwards in some cases, for example if the LFM material is used as an oil-coalescer.

During testing, the combination of an LFM filter and a 5-micron cartridge filter was operated with a natural seawater feed source. A 10-inch long LFM filter (containing 40 pre-compressed LFM filter balls) routinely filtered 18,000 to 20,000 gallons of natural seawater with a feed-water turbidity level of 1-5 NTU (Nephelometric Turbidity Units). During this test, LFM filter cleanings were initiated when a 10 to 15 psi differential pressure was reached. This longevity of operation for such a compact and lightweight filter that is field-cleanable is truly impressive. Furthermore, the test results show that an LFM filter, followed by one 5 micron cartridge filter, resulted in an average turbidity removal between 85% to 95% during the test period that processed a total of over 300,000 gallons of raw seawater (in just one 10-inch long LFM filter). In addition, the LFM filter stage (stage 1) was shown to protect a 5-micron cartridge filter (stage 2) and resulted in extending the life of the cartridge filter by a factor as much as 8 times (compared to no pre-filter).

During additional testing, Arizona fine AC test dust was added to raw seawater feed to create a high-turbidity feed-water challenge of 50 NTU turbidity. As shown in the graph below, during the 50 NTU test, turbidity reduction was consistent and averaged over 95% for the LFM filter followed by a 1-micron cartridge. It was determined that the LFM filter alone removed about 50% of the turbidity-creating particulates and the 1-micron cartridge removed the remaining 45% of particulates. Also shown in the graph, the LFM Filter, alone, reduced turbidity from over 50 NTU to a range of 10-17 NTU, while the 1-micron cartridge reduced turbidity further to less than 1 NTU. This result for the LFM filter is comparable to testing the turbidity reduction of multi-media and sand filters followed by 1-3-micron cartridge filters.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A water filtration system comprising:
   an elongate housing having an inlet at one end and an outlet at an opposing end;
   a center cylinder extending axially within the elongate housing and spaced from an elongate interior surface of the elongate housing, defining an annular space therebetween, a first end of the center cylinder adjacent the inlet being imperforate with the opposing end of the center cylinder being perforated;
   a hydraulic media plate substantially corresponding in shape to the cross-sectional area of the center cylinder and having a hole extending therethrough, is disposed within the center cylinder;
   a tube having a first closed end extending through the hole and a second perforated end in fluid communication with the outlet; and
   a plurality of lightweight fibrous media balls disposed within the center cylinder between the hydraulic media plate and the opposing end of the elongate housing, and surrounding the perforated end of the tube;
   wherein a flow of water to be filtered enters the elongate housing through the inlet, urging the hydraulic media plate away from the inlet end of the elongate housing and compressing the lightweight fibrous media balls until the flow of water can flow through the perforated portion of the central cylinder and into the annular space, where it can then flow back through the perforated cylinder at points more distant from the inlet, through the compressed lightweight fibrous media balls, into the perforated tube and out through the elongate housing outlet.

2. The water filtration system of claim 1, further comprising:
   a backwash inlet extending through the opposing end of the elongate housing for the introduction of one or more backwash fluids into the center cylinder, the introduction of the one or more backwash fluids causes the hydraulic media plate to move towards the inlet and the lightweight fibrous media balls to expand, and captured contaminants flushed therefrom.

3. The water filtration system of claim 1, wherein the lightweight fibrous media balls are made of a synthetic material.

4. The water filtration system of claim 3, wherein the synthetic material includes polyethylene.

5. The water filtration system of claim 3, wherein the synthetic material includes polypropylene.

6. The water filtration system of claim 3, wherein the synthetic material has an affinity for oil.

* * * * *